July 23, 1963   M. M. BREEZE, JR., ETAL   3,098,401
DRILL PLATE AND METHODS OF MAKING A DRILL PLATE
Filed May 24, 1961

INVENTORS
M. M. BREEZE JR.
J. O. ETCHISON JR.
BY R. P. Miller

United States Patent Office 3,098,401
Patented July 23, 1963

3,098,401
DRILL PLATE AND METHODS OF MAKING A DRILL PLATE
Marvin M. Breeze, Jr., and John O. Etchison, Jr., both of Forsyth, N.C., assignors to Western Electric Company, Incorporated, New York, N.Y., a corporation of New York
Filed May 24, 1961, Ser. No. 112,345
6 Claims. (Cl. 77—62)

This invention relates to a drill plate and methods of making a drill plate and more particularly to a drill plate composed of metal particles suspended in a resinous material and methods of making a drill plate composed of metal particles suspended in resinous material.

In the past drill plates have been made of relatively hard homogeneous materials such as mild steel. These plates are extremely expensive to produce due to the cost of the material involved and the difficulty of drilling accurate holes for receipt of the drill or work tool. Additionally iron or steel drill plates have a tendency to reduce the life of a drill or tool with which such a plate is used. A drill will often strike the periphery of a plate hole when the drill is guided into engagement with the plate. When a steel drill plate is used and a hardened steel drill strikes the edge of the hole in the plate, either the plate itself or the cutting tool which is being used will be damaged by having chips of material broken out of the plate or tool; thus, shortening the useful life of the tool and requiring replacement of an expensive drill plate. The applicant proposes to overcome these difficulties by using an inexpensive drill plate which is much softer than the usual steel drill plate used by industry, but which will also function to accurately guide the drill during the drilling operation. The drill plate disclosed by applicant is composed of a soft resinous material with suspended metal chips and is not injurious to a hard cutting tool such as a drill since the resinous material is very soft as compared to a hardened steel drill. The metal chips regulate the relative overall hardness of the plate and incorporate some of the more desirable features of a harder material.

The method disclosed for producing a resinous drill plate having suspended metal particles is very economical since such a plate is composed of inexpensive easily workable materials which make replacement costs much lessthan the replacement cost of a similar plate made of steel. Additionally the plate disclosed by applicant has coolant reservoirs incorporated within the body of the drill plate for retaining cooling liquid which maintains the cutting tool or drill at a low temperature to prevent heat damage to the hardened steel tool or drill.

It is an object of the present invention to provide a new and improved drill plate and methods of making a new and improved drill plate.

Another object is to produce a drill plate composed of a mixture of steel particles embedded in a resinous material.

It is still a further object of the present invention to produce a drill plate having cavities about the periphery of a drill guide hole in order to trap coolant or lubricating liquid.

A still further object of the present invention is to provide a method of producing a molded drill plate composed of steel particles and resin and having the steel particles concentrated about the periphery of the tool hole by magnetic attraction.

Another object is to provide methods for making drill plates composed of steel fragments embedded in a suspension medium and for producing oil cavities about the periphery of the tool receiving holes of the plate.

With these and other objects in view, the present invention contemplates positioning a paramagnetic core within an open mold at predetermined locations in the mold. A suspension medium such as an unpolymerized resin is then poured into the mold about the core after which steel particles are suspended in the suspension medium. The core is then magnetized so that the steel particles suspended in the suspension medium are attracted about the magnetic core after which the suspension medium is polymerized, cured, or hardened by some well-known method to produce a solid body.

Other objects and advantages of the invention may be readily ascertained from the following detailed description when considered in conjunction with the accompanying drawings wherein.

Figure 1:
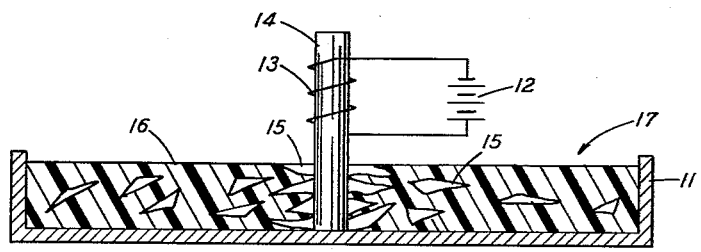
FIG. 1 is a cross section view of a mold containing the mixture of the suspension medium and steel particles molded about a magnetic core.
Figure 2:
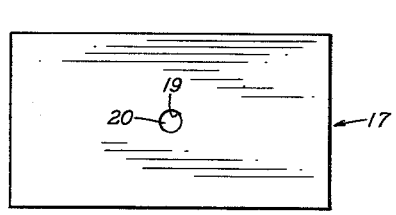
FIG. 2 shows a plan view of a completed mold having only a single drill or tool hole therein.

Referring now to the drawing and in particular to FIG. 1, there is shown a mold 11 having a magnetic core 14 in contact with the bottom of the mold 11. An electromagnetic core 14 is utilized to accurately locate a drill hole 20 at a predetermined location in the drill plate 17 and also for the purpose of magnetically attracting steel particles on shavings 15 in order to properly orient and concentrate the particles 15 about the hole to be formed in the plate 17. The drill plate body is designated by reference numeral 17 within mold 11 and is composed of a mixture of metal shavings 15 such as work hardened steel chips and a moldable plastic material such as, for example, one of the well-known polyester resins or an epoxy resin such as that produced by the reaction of epichlorohydrin with bisephenol which has the characteristic of shrinking when it is cured.

A preferred method of producing this drill plate 17 may be as follows:

A magnetic core 14 is positioned in mold 11 at a predetermined location in order to form the drill hole 20 in the finished drill plate 17. The core 14 may either be suspended in mold 11 or it may be attached to mold 11 by some well-known means. Any number and size of cores may be used depending on the specific requirements for a particular drill plate. Further, the cores may be composed of permanent magnetic material. A single core 14 is used only for illustration of the principles involved.

Next, a suspension medium 16 such as the aforementioned epoxy resin is poured into mold 11 about core 14. Metal particles 15 such as iron, steel, or other paramagnetic material, but preferably of tool steel are then suspended in suspension medium 16 by pouring the steel particles into the suspension medium and distributing the steel particles throughout the mold by agitation or some such means. It should be noted that the steel particles 15 may also be mixed with suspension medium 16 prior to pouring the suspension medium 16 into the mold. A coil 13 is placed about core 14 and connected to a battery 12 or other source of electrical power. Coil 13, battery 12, and core 14 produce a magnetic field about core 14 for the purpose of attracting the steel particles 15 and forcing them to migrate from other parts of the liquid suspension medium 16 to a position about the core 14. Attraction of the particles 15 about core 14 result in a concentration of the steel particles in the wall 19 where the particles are most useful for the purpose of providing a wall facing which is contacted by the hard cutting tool or drill and for reinforcing the wall 19. It has been found that a desirable mixture of steel particles 15 and resinous medium 16 in the wall surface may be a 50% mixture of each. However, satisfactory drill plates may be produced by making the concentration of steel particles 15 in the wall as high as 85%. Use of magnetizable core 14 can reduce the need for a high concentration of steel particles 15 in suspension medium 16 since additional particles 15 can be attracted to wall 19 to produce the desired concentration of particles in the wall and in the immediate surrounding area. If a magnetizable core 14 is not used to concentrate the particles 15 in the wall, then the same result can be attained by simply making the entire mixture of particles and resin of the ratio desired in the walls 19. Some method of obtaining relatively high concentration of particles 15 is desirable; however, since hardened cutting tools have a tendency to wear away the relatively soft suspension medium 16 at excessive rates.

Next the suspension medium 16 is cured, polymerized, or otherwise hardened in order to permanently suspend the steel particles 15 therein and also to produce a relatively rigid plate which is useable as a drill plate.

If the reaction product of epichlorohydrin bisephenol is used as the suspension medium 16, it is cured to a solid mass by mixing 100 parts of the reaction product with 9 parts of an amine catalyst such as metaphenylene diamine or ethylene diamine. The mixture is maintained at room temperature for a period of four hours. The resulting solidified resin is sufficiently hard to serve as drill plate material. Other catalysts or a different ratio of catalyst-to-resin mixture can be cured to a desired solid at different curing temperatures and curing periods. The curing process may be varied with the same or different resins to satisfy specific production requirements. Next, the core 14 is removed from the mold 11 and drill plate 17 is then removed from mold 11 as a finished product and is ready to be used as a drill plate in a production setup.

Figure 4:
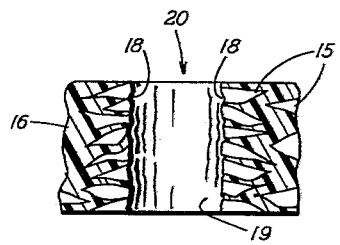
FIG. 4 is a fragmentary cross section view of a plate showing the orientation of the steel particles about the periphery of a drill hole and showing the coolant cavities in the wall of the hole.
Figure 3:
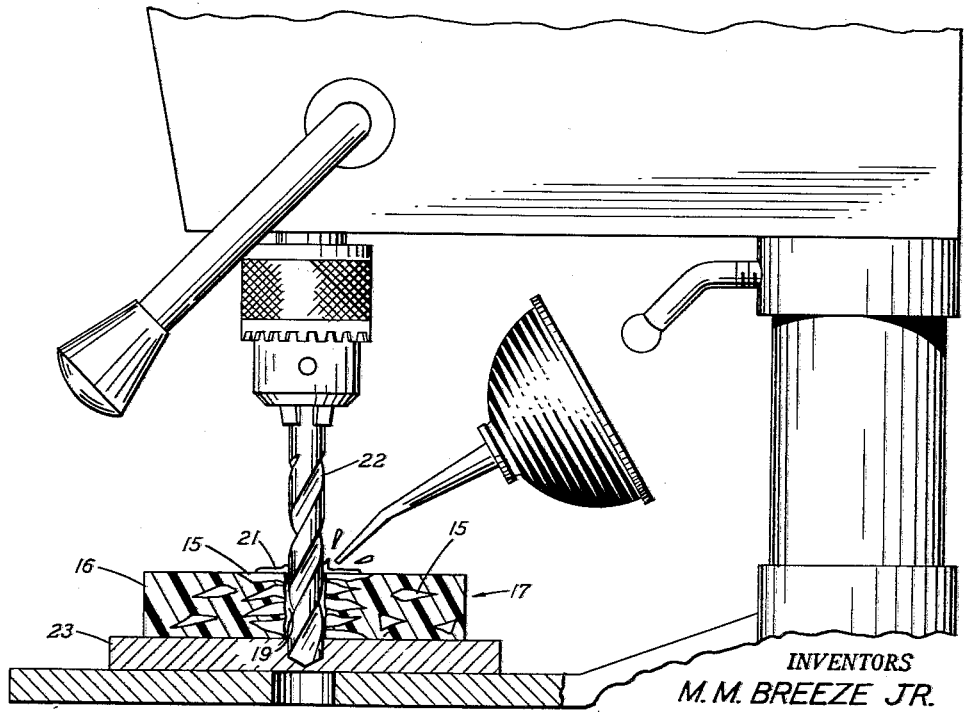
FIG. 3 is a cross section view of a completed drill plate showing the oil cavities which are present about the periphery of the drill hole and mounted on a drill press in operating position.

If the proper resin or suspension medium 16 such as the aforementioned epoxy resin, is chosen, the drill plate 17 can be made not only to serve as an inexpensive drill plate to guide a tool, but it may be used as a means of maintaining a reservoir of coolant or lubricating liquid about the tool. Many resins have the characteristic of shrinking as they are polymerized, cured, or hardened. A preferred embodiment of the invention utilizes one of these resins having these shrinking characteristics as the suspension medium 16. Curing of the resin will result in cavities 18 between the steel particles 15, see FIG. 4, about the periphery 19 of hole 20. Failure of the molded resin to completely fill the areas surrounding the steel particles 15 also results in the production of cavities 18. Coolant or lubricating fluid 21 is sprayed about the tool 22 and is forced by gravity down along the walls 19 of the hole 20 and is retained in cavities 18 in the wall 19 to cool or lubricate the tool 22. This feature of the drill plate is rather important since cooling and lubricating a high speed tool such as a drill is of great importance to prevent heat damage or wear to prolong the life of the tool and in order to aid disposal of particles of metal or other waste material which is being drilled from the workpiece 23.

It is to be understood that the above-described method, article, and apparatus are merely illustrative of the application of the principles of the invention and many other modifications may be made without departing from the scope and spirit thereof.

What is claimed is:

1. A method of making a drill plate having tool guide holes which comprises the steps of supporting a magnetizable core in a mold, pouring a liquid suspension material that shrinks upon curing about the core in said mold, suspending chips of paramagnetic material in the suspension material, magnetizing the core to attract the chips to orient the chips about the core, curing the suspension material to form a solid to permanently suspend the chips in the suspension material and to shrink said suspension material to form cavities between the chips oriented about the core, and then removing the core to expose the solidified suspension material and chips oriented about the core.

2. A method of making a drill plate having tool guide holes which comprises the steps of supporting a magnetizable core in the mold, intimately mixing chips of ferromagnetic material in an uncured resinous liquid material that shrinks upon curing, pouring the mixture about the core in said mold, magnetizing the core to attract the ferromagnetic chips to concentrate the chips about the core, and then curing said resinous material to a solid to permanently suspend said chips and to shrink said resinous material to form cavities between the chips concentrated near said core.

3. A method of making a drill plate having tool guide holes and composed of a heterogeneous material which comprises the steps of supporting a magnetizable core in a mold, pouring an uncured epoxy resin about said core, suspending a quantity of work-hardened paramagnetic steel chips in the epoxy resin to produce a mixture of 50 to 85% steel and 15 to 50% epoxy resin, magnetizing the core to attract the chips and orient the chips about said core, curing said resin to permanently suspend said chips and to shrink said resin to form cavities between the chips oriented near said core, and then removing said core to expose the chips and resin disposed about said core.

4. A drill plate having tool guide holes comprising a body composed of a resin with chips of metal suspended in the resin and concentrated in the walls of said holes to produce tool engaging walls and having cavities in said tool engaging walls about said metal chips.

5. A drill plate with tool guide holes comprising a body composed of an epoxy resin with particles of metal suspended in the resin and concentrated about the periphery of said hole to produce a tool engaging surface composed of from 50 to 85% metal and from 15 to 50% resin having cavities in the tool engaging walls of the holes about the metal particles.

6. A method of making a drill plate which comprises the steps of mixing chips of metal in an uncured resin to produce a homogeneous mixture consisting of 50 to 85 percent metal chips and 15 to 50 percent uncured resin, supporting a core in a mold, pouring the mixture of resin and chips about the core in the mold, curing the resin to permanently suspend the chips, and then removing the core to expose a surface consisting of 50 to 85 percent chips and 15 to 50 percent resin.

References Cited in the file of this patent

UNITED STATES PATENTS

| | | |
|---|---|---|
| 2,392,804 | Basolo | Jan. 15, 1946 |
| 2,915,789 | Dykstra et al. | Dec. 8, 1959 |
| 2,967,756 | Mazzucchelli et al. | Jan. 10, 1961 |
| 3,061,888 | Wadham | Nov. 6, 1962 |